United States Patent
Radermacher (10) Patent No.: US 9,538,596 B2
(45) Date of Patent: Jan. 3, 2017

(54) LIGHTING UNIT WITH LED STRIP

(75) Inventor: Harald Josef Günther Radermacher, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 447 days.

(21) Appl. No.: 13/983,086

(22) PCT Filed: Feb. 1, 2012

(86) PCT No.: PCT/IB2012/050471
§ 371 (c)(1),
(2), (4) Date: Aug. 1, 2013

(87) PCT Pub. No.: WO2012/104800
PCT Pub. Date: Aug. 9, 2012

(65) Prior Publication Data
US 2013/0313983 A1 Nov. 28, 2013

(30) Foreign Application Priority Data
Feb. 4, 2011 (EP) .................................... 11153361

(51) Int. Cl.
H05B 37/00 (2006.01)
H05B 33/08 (2006.01)
F21V 23/00 (2015.01)
F21Y 101/00 (2016.01)

(52) U.S. Cl.
CPC .............. H05B 33/083 (2013.01); F21K 9/27 (2016.08); H05B 33/0803 (2013.01); H05B 33/0815 (2013.01); H05B 33/0827 (2013.01); F21V 23/005 (2013.01); F21Y 2101/00 (2013.01); Y02B 20/347 (2013.01)

(58) Field of Classification Search
CPC .............. H05B 33/083; H05B 33/0848; H05B 33/0803; H05B 33/0827; F21Y 2101/02
USPC ......... 315/187, 185 R, 186, 185 S, 193, 291, 315/294; 362/234, 238, 800, 545, 227, 362/249, 250, 251, 252, 806–812
See application file for complete search history.

(56) References Cited

U.S. PATENT DOCUMENTS 5,559,681 A 9/1996 Duarte
6,371,637 B1* 4/2002 Atchinson ............... F21S 4/007
362/249.04

(Continued)

FOREIGN PATENT DOCUMENTS

CN 101545596 A 9/2009
CN 201368371 Y 12/2009

(Continued)

OTHER PUBLICATIONS

"LM317 3-Terminal Adjustable Regulator", Texa Instruments, Sep. 1997, Revised Oct. 2014, http://www.ti.com/lit/ds/symlink/lm317.pdf.*

Primary Examiner — Lincoln Donovan
Assistant Examiner — Thomas Skibinski (57) ABSTRACT

What is described is a lighting unit 10 with a plurality of lighting segments 30a, 30b. The lighting segments 30a, 30b are arranged on a strip 40 in spaced relation from each other. Each lighting segment 30a, 30b is connected to an electrical supply terminal 20. In order to obtain a lighting unit with a flexible electrical configuration, each lighting segment 30a, 30b comprises at least one LED element and at least one driver circuit 36 including a controllable, current limiting element for controlling a current through the LED element.

15 Claims, 8 Drawing Sheets

(56) References Cited

U.S. PATENT DOCUMENTS

| | | | |
|---|---|---|---|
| 2003/0071581 A1* | 4/2003 | Panagotacos | F21S 4/001 315/185 R |
| 2004/0252501 A1 | 12/2004 | Moriyama et al. | |
| 2007/0274067 A1* | 11/2007 | Sloan | F21S 4/007 362/219 |
| 2008/0290814 A1* | 11/2008 | Leong | F21K 9/00 315/294 |
| 2009/0154156 A1 | 6/2009 | Lo et al. | |

FOREIGN PATENT DOCUMENTS

| | | |
|---|---|---|
| JP | 2005123178 A | 5/2005 |
| JP | 2009200011 A | 9/2009 |
| JP | 2010157486 A | 7/2010 |
| WO | 9906759 A1 | 2/1999 |
| WO | 2009131340 A2 | 10/2009 |

* cited by examiner

LIGHTING UNIT WITH LED STRIP

FIELD OF THE INVENTION

The invention relates to a lighting unit and to a lighting fixture including a lighting unit. More specifically, the invention relates to a lighting unit comprising a number of LED elements.

BACKGROUND OF THE INVENTION

The lighting unit according to the invention is intended to be used in lighting applications, i.e. provide a light output suitable in particular for illumination purposes. Particularly, but not exclusively, a lighting unit according to the invention may be used as an LED replacement for prior art lamps, such as incandescent or fluorescent lamps (LED retrofit). For this use, the lighting unit needs to be provided with mechanical and/or electrical means compatible with the lamp to be replaced.

LEDs (Light Emitting Diodes) offer advantages such as high efficiency and long lifetime. However, an individual LED delivers luminous flux only from a small area. For lighting purposes, generally a plurality of LEDs are required.

US 2008/0290814 A1 discloses a light emitting diode (LED) lamp mounted to an existing fixture for a fluorescent lamp. The fixture comprises a ballast delivering electrical power to the lamp, which has a tubular housing around discrete or surface mount LEDs compactly arranged and fixedly mounted on a flat rectangular flexible circuit board. The AC power generated by the external fluorescent ballast is converted to DC power by bridge rectifiers to convert the AC voltage to DC voltage. The individual LEDs may be electrically connected in series, in parallel, or in a combination of series and/or parallel configurations. In preferred examples, two LEDs are connected in series with a current limiting resistor. A plurality of such series circuits are connected in parallel to the rectifier. A filter capacitor may be also arranged in parallel.

A lighting unit as described in US 2008/0290814 A1 may be used for retrofitting, i.e. replacing prior art fluorescent lamps by a lamp, or lighting unit, based on LEDs. However, the electrical design is not flexible, so that for a different number of LEDs the electrical circuitry needs to be adapted.

SUMMARY OF THE INVENTION

It would be desirable to provide a lighting unit having an easily adaptable electrical design, i.e. wherein different lighting units with a different number of LEDs may be provided with a minimum of changes in the electrical circuitry.

This is achieved by a lighting unit according to claim 1. Dependent claims refer to preferred embodiments of the invention.

It is a basic idea of the present invention to provide LED elements on a strip, i.e. an elongate arrangement where not only the LED elements themselves are arranged lengthwise on the strip in spaced relation, but also active circuit elements acting as driver electronics. Thus, according to the underlying idea of the invention, the driver electronics are, at least in part, distributed over the length of the strip. This has the advantage that electrical losses in the driver electronics are also distributed over the length of the strip, and that the electrical design of a lighting unit comprising a plurality of such elements on a strip is easily scalable.

According to the invention, a lighting unit comprises at least a strip, i.e. an elongate element on which a plurality of lighting segments are arranged in spaced relation from each other. Each of the lighting segments has a direct or indirect electrical connection to at least one electrical supply terminal, preferably at one end or both ends of the strip, such that the lighting segments may be operated with electrical power supplied from the electrical supply terminal.

The number of lighting segments provided on the strip may vary greatly. It is preferred to provide at least 2 lighting segments, further preferred to provide at least 3 lighting segments. The number of lighting segments chosen will depend on the desired application, in particular the total luminous flux required and the outer dimensions of the lighting unit. For example, a replacement for a typical fluorescence tube may require a flux of 1000 lumen or more. This flux is to be spread across the length of the tube, requiring several segments of a strip to be distributed over the length of the tube. Assuming a segment extending across a distance of about 10 cm and delivering about 200 lumen, a replacement for a 36 W TL tube with a total length of about 120 cm might use a string comprising 11 segments. In an alternative application, where a total output flux of only about 200 lm or about 400 lm is required, such as in the case where incandescent light bulbs of 15 to 40 W are to be replaced, e.g. two segments might be used. In any case, both the light and the losses are beneficially spread along the length of the lighting unit.

Further, according to the invention, each lighting segment comprises at least one LED element and at least one driver circuit for controlling a current through the LED element.

There may be a single LED element present in each lighting segment, which may be of any type comprising known semiconductor LEDs or OLEDs of any colour. In particular, a plurality of individual LED elements may be present, electrically arranged in series, in parallel or in a combination of series and parallel connections within each lighting segment. The LED elements may be of the same or different color, e.g. different color temperature. As will be shown in preferred embodiments hereinbelow, it is particularly preferred to provide a number of at least 2 LED elements in series in each segment. For many applications, a higher number of LEDs such as more than 3, or more than 5, may be used. The number of LED elements arranged in series is preferably chosen in accordance with the total available supply voltage and the sum of forward voltages of LED elements. In order to obtain high efficiency during nominal operation, it may be preferred that the sum of forward voltages is at least 60% of the voltage value of a constant DC supply voltage (or in the case of varying supply voltage, such as rectified AC voltage, at least 60% of the minimum voltage value thereof). It is further preferred that the sum of forward voltages is more than 75%, most preferably more than 90% of the constant DC (or minimally varying DC) voltage value. For example, in a LED lighting unit intended to replace fluorescent tube lamps receiving approximately 100 V AC voltage from a ballast, 33 LED elements with a forward voltage of 3 V may be connected in series.

According to the invention, the driver circuit includes a controllable current limiting element. Such a controllable current limiting element accepts a control input, such as a control voltage or current, and, in response to this control input, actively controls a current through the LED element. Examples of electrical components that may be used as controllable current limiting elements are active electrical components. Preferably, the controllable current limiting element is, or at least comprises, at least one transistor, which, as will be demonstrated in preferred embodiments, may be e.g. a field effect transistor (FET) or bipolar transistor.

Within the lighting unit, the strip thus provides mechanical arrangement and electrical connection of the lighting segments. Preferably, the strip will also be heat-conductive to spread the losses of the components it incorporates along its length. The lighting unit may consist of the strip alone, or may comprise further elements, including mechanical elements such as a carrier, housing etc. as well as electrical elements, such as an electrical power supply circuit to be connected to the electrical supply terminal. The strip may be arranged within the lighting unit e.g. in a straight line, but alternatively could be provided in other shapes, such as bent into an arch or one or more circles, wound around a carrier element, in a serpentine pattern, etc. The material of the strip is preferably flexible, so that the strip may be wound in a roll. For example, the strip may comprise a flexible carrier material of flat, elongate form, with electrical components and electrical connections being provided on one or both surfaces thereof. Alternatively, the strip may even be held together only by electrical wiring without a non-conducting carrier material. While LED elements may be provided to emit light from both opposed surfaces of the strip, it is preferred to arrange LED elements so as to only emit light from one side. In this case, preferably, the opposite side has flat regions and may be covered with adhesive, such that it can be attached to a carrier and transport its thermal losses via the flat region to the carrier.

According to a preferred embodiment of the invention, the individual lighting segments, which preferably comprise an identical electrical circuit configuration, comprise at least one segment input terminal and at least one segment output terminal for electrical connection within each lighting segment. It is preferred that segment input and output terminals are directly connected, e.g. by continuous conductive tracks on the strip. A first one of the lighting segments, which is preferably arranged at a first end of the strip, may have its segment input terminal directly electrically connected to the electrical supply terminal. Further lighting segments, and preferably all further lighting segments arranged on the strip, are connected such that their segment input terminal is directly connected only to a segment output terminal of the neighbouring (preceding) lighting segment, but not necessarily directly to the electrical supply terminal. Thus, the supply of electrical power from the electrical supply terminal to the further lighting segments may be conducted via at least the first lighting segment.

It is further preferred that in the case of lighting segments with segment input terminal and segment output terminal, the strip is severable between the lighting segments by separation between a segment output terminal of one lighting segment and a segment input terminal of the following lighting segment. The circuit is such that after said separation, the remaining lighting segments, from which further segments have been separated, are still operable by supplying electrical power to the electrical supply terminal. Thus, with respect to a strip comprising a plurality of, for example, 100 lighting segments arranged next to one another in the longitudinal direction, it is possible to separate a first subset of e.g. 10 segments from said strip by severing the strip between the segment output terminal of the last ($10^{th}$) lighting segment of the subset and the segment input terminal of the following ($11^{th}$) segment. By virtue of the electrical circuit, the (e.g. 10) segments separated from the strip to be used in the lighting unit are then operable if connected to an electrical power supply. It is further preferred that the electrical circuit also enables the segments separated from the lighting unit, i.e. those remaining on a roll, for example, to be still functional in the same way.

Thus, advantageously, the strip may be provided in endless fashion, e.g. on a roll. For each lighting unit to be manufactured, a corresponding length of the strip with a number of lighting segments may be used and separated from the roll. In each case, the separated part will be fully functional, and since the driver circuitry is distributed over the length of the strip, may simply be operated by supplying electrical power.

According to a preferred embodiment of the invention, the controllable current limiting element in the driver circuit of each lighting segment is controlled by a control signal from a control signal circuit. Preferably, control is effected to obtain a constant current through the LED element, most preferably even in cases where an electrical supply voltage may vary (within predefined boundaries, whereas outside these boundaries the current may be changed, e.g. reduced to prevent overheating). As will be discussed in relation to preferred embodiments, a local control signal circuit may be provided in each of the segments as part of the driver circuit. Alternatively, it is also possible to provide the control signal circuit so as to be separate from the individual lighting segment, e.g. such that a central control circuit delivers a control signal to a plurality of current limiting elements of different lighting segments. Also, the control signal may be provided both from a local control signal circuit portion provided in each of the lighting segments and a further, central control signal circuit portion connected to each local control signal circuit portion. As discussed in relation to preferred embodiments, central and local control signal circuits may be coupled in a variety of ways, such as e.g. directly, via a capacitor or via a Zener diode.

Preferably, the control signal circuit comprises a reference voltage element to deliver a constant voltage signal. Such a reference voltage element may be an individual electrical component such as a band gap reference or, most preferably, a Zener diode, or alternatively an electrical circuit with a plurality of electrical components, such as e.g. a voltage divider circuit. The reference voltage element may be used to deliver a control signal to the controllable current limiting element, leading to a constant current through the LED element.

In an embodiment of the invention, a central control unit may be provided within the lighting unit for delivering a central control signal to the individual lighting segments. Preferably, each lighting segment comprises a control signal input terminal and a control signal output terminal, and the central control signal may thus be delivered by conduction through the individual lighting segments to each of the driver circuits.

A central controller may be used for adjusting the current through the LED elements to a desired level, such as for dimming the total light output. Also, it is possible to use the central control signal to provide a variation in the driving current of the LED elements, and thus produce a time modulation of the luminous flux generated by the lighting unit. The modulation level and timing may be chosen such that the light output from the lighting unit is still perceived to be constant by the human eye.

According to a further preferred embodiment of the invention, a capacitor is arranged to buffer the supply voltage. For example, the lighting unit may comprise one or more capacitors, e.g. arranged at the ends of the strip, to buffer the supply voltage and limit ripple of the voltage. It is, however, particularly preferred to provide at least one buffer capacitor within each lighting segment. In this way, the electrical design is easily scalable, because the total buffer capacity is distributed along the length of the strip. It is particularly preferred to arrange the buffer capacitor in parallel to a series connection of at least the LED element and the controllable current limiting element.

According to a further preferred embodiment, a current sensing element is provided in series connection with at least the LED element. Such a current sensing element may preferably be a series resistor. The voltage across the series resistor is indicative of the current through the LED element and may be used as a feedback control signal. While it is generally preferred to provide the lighting segments with identical electrical components, it is possible to provide different resistance values for the series resistor, e.g. to compensate for possible tolerances of electrical components, or even to compensate for the influence of a different number of LEDs in individual lighting segments. It is possible to change the resistance value to a desired level after mounting the resistor, or after manufacturing a part of the strip that incorporates the resistor, e.g. by laser trimming.

Further preferred embodiments relate to the topology of the electrical connection. It is preferred that the individual lighting segments are electrically connected in parallel to the electrical supply terminal. Further, it is preferred that each lighting segment comprises a plurality of LEDs electrically connected in series.

According to a further preferred embodiment, the lighting unit further comprises an electrical supply unit including an AC/DC converter to supply DC voltage. The AC/DC converter is preferably a bridge rectifier circuit. The DC electrical power is preferably supplied to the electrical supply terminal.

According to a further embodiment, the lighting unit comprises an elongate housing element, which is preferably tubular, i.e. of circular cross-section. This is particularly preferred for LED retrofit lighting units to replace fluorescent tube lamps. The housing element has electrical contacts provided at at least one end thereof to supply electrical power. The lighting unit including such an elongate housing element is preferably shaped to fit into existing lighting fixtures, such as those originally intended for fluorescent lamps. While it is possible to provide the strip on the outside of the housing element, it is preferred to arrange the strip within the housing element, which in this case preferably is a transparent or translucent enclosure.

Generally, it is preferred for the lighting unit to provide means at least for a mechanical and electrical connection to a lighting fixture. Both the mechanical and the electrical connection are preferably detachable, such as a plug-in connection, clamp connection or the like. Further, there may be provided also other connections, such as a thermal connection (e.g. external cooling, heat-spreading, radiating means). If the lighting unit is used in a lighting fixture, a ballast may be provided for supplying AC electrical power to a socket of the lighting fixture. The lighting unit is then connected to this socket, such that the AC electrical power is supplied to the lighting unit. An electrical supply unit including an AC/DC converter is preferably provided to supply DC electrical power to the electrical supply terminal of the strip.

BRIEF DESCRIPTION OF THE DRAWINGS

The above and other features, objects and advantages of the present invention will become apparent from the following description of preferred embodiments, in which.

DETAILED DESCRIPTION

Figure 1:
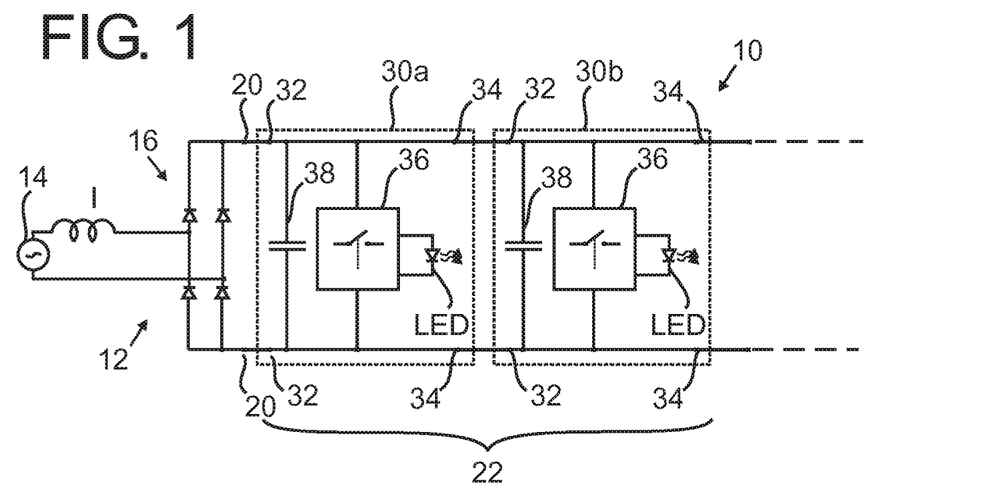
FIG. 1 shows a schematic drawing of an electrical circuit of a lighting unit.
Figure 2:
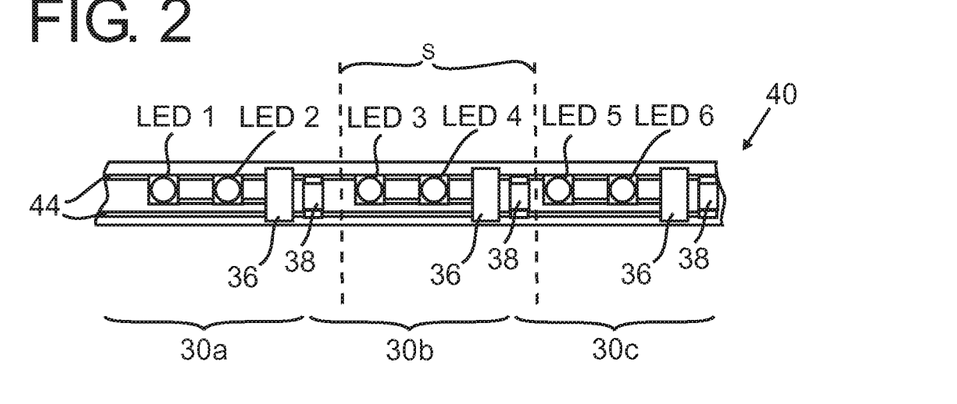
FIG. 2 shows a top view of an LED strip.
Figure 3:
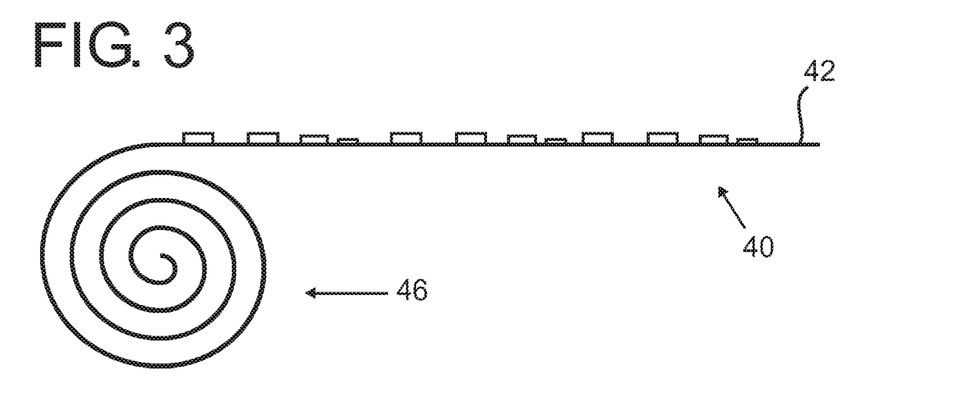

FIG. 1 shows a circuit diagram of a lighting unit 10 comprising an electrical supply unit 12 with an AC power supply 14 and, connected therewith, an inductance I and a full bridge rectifying circuit 16. The electrical supply unit 12 thus supplies DC (rectified AC) electrical power to electrical supply terminals 20 of a string 22 of identical lighting segments, of which in FIG. 1 a first lighting segment 30a and a second lighting segment 30b are shown only. The lighting segments 30a, 30b are arranged on a strip 40 as shown in FIGS. 2, 3. Each lighting segment 30a, 30b comprises segment input terminals 32, each directly connected to segment output terminals 34. All lighting segments 30a, 30b in the string 22 are connected in a sequence, such that the first lighting segment 30a is connected with segment input terminal 32 to the electrical supply terminal 20, and the second lighting segment 30b and each following lighting segment is connected with its segment input terminal 32 to the segment output terminal 34 of the preceding lighting segment. Thus, the electrical power supplied from the electrical supply unit 12 is conducted through each lighting segment 30a, 30b to the following segments.

Within each lighting segment 30a, 30b, a driver circuit 36 and a light emitting diode element LED are connected between the segment input terminals 32.

A smoothing capacitor 38 is also connected to the segment input terminals 32 in parallel to the driver circuit 36 and LED.

The driver circuit 36, of which examples will be shown below, serves to operate the LED with a controlled driving current. The driving circuit controls the driving current through the LED to a constant value despite variation (within certain limits) in the voltage supplied at the segment input terminals 32. The voltage supplied here by the electrical supply unit 12 is a rectified voltage and will therefore be subject to variations. In each lighting segment 30a, 30b, the buffer capacitor 38 serves to stabilize this voltage. However, a certain degree of ripple will remain. The driver circuit 36 however will supply a constant driving current of a desired value to the LED. Alternatively, the driver circuit 36 may supply a driving current to the LED according to other control criteria, such as to obtain a constant luminous flux etc.

As the skilled person will appreciate, the string circuit 22 requires very little drive circuitry from the outside—supply of a DC voltage, even varying within bounds, at the electrical supply terminals 20 is sufficient to operate all LEDs within the individual lighting segments 30a, 30b at a desired operating point. Due to the distributed structure of the circuit, where in each lighting segment 30a, 30b the circuitry associated with the LED is provided, electrical losses, which will occur in operation specifically at the driver circuits 36, are therefore also distributed over the entire circuit and do not appear only within a single element or unit. Thus, heat generated by these losses will automatically be evenly distributed over the circuit.

Further, each lighting segment 30a, 30b with full circuitry will be operable even if it is separated from other segments, and so will any sequence of lighting segments 30a, 30b if they are separated between segment output terminals 34 and segment input terminals 34 of the following lighting segment.

FIG. 2, FIG. 3 show a strip 40, where on a flexible, electrically insulating carrier material 42 provided as a flat, elongate strip, electrically conductive tracks 44 and electrical components are provided according to the circuit 10 described above. The LED strip 40, which due to the flexible properties of the carrier 42 may be wound on a roll 46 (FIG. 3), provides individual lighting segments 30a, 30b, 30c etc. in an endless configuration. Individual LED strips 40 of desired length may be cut out of this roll 46 by a separating operation between the segment input and output terminals 32, 34, i.e. by cutting the strip 40 e.g. along the lines S in FIG. 2, thereby separating the conductive tracks 44, which form a through-connection through all lighting segments 30a-30c.

Figure 4:
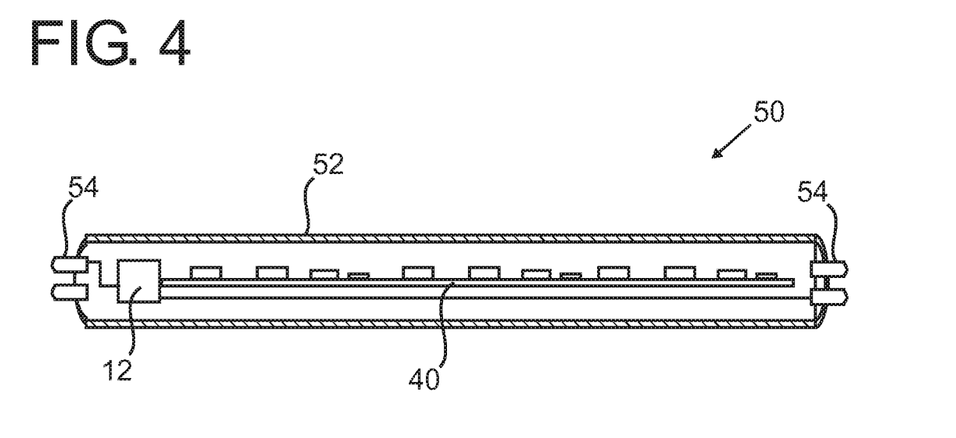
FIG. 4 shows a longitudinal sectional view of an LED lighting unit.

FIG. 4 shows in a symbolical longitudinal sectional view a lighting unit 50 comprising a strip 40 provided within a translucent tubular enclosure 52. A separate or integrated holder (not shown) may be provided for the LED strip 40. At the ends of the lighting unit 50, plug contacts 54 are provided, which are electrically connected to an electrical supply unit 12 provided also within the translucent enclosure 52. The lighting sections of the strip 40 are supplied by the electrical supply unit 12, preferably comprising no more than a rectifying circuit.

In a first example of an LED retrofit replacement for fluorescent tube lamps (TL), each lighting segment may deliver a luminous flux of 200 lm from a length of 10 cm. For a lighting unit replacing a 36 W TL tube with a total length of about 120 cm, a string of 11 segments may be used.

In a further example, a series of TL lamps having an overall length of 60 cm, 120 cm, and 150 cm may be replaced by lighting units including strips having segments of 27-30 cm in length which in nominal operation provide a luminous flux of 600 lm each. In this case, for replacement of the 60 cm tube, 2 lighting segments may be used, 4 lighting segments may be used for the 120 cm tube and 5 lighting segments may be used for the 150 cm tube. It should be noted that in each case the same electrical supply unit may be used.

Figure 5:
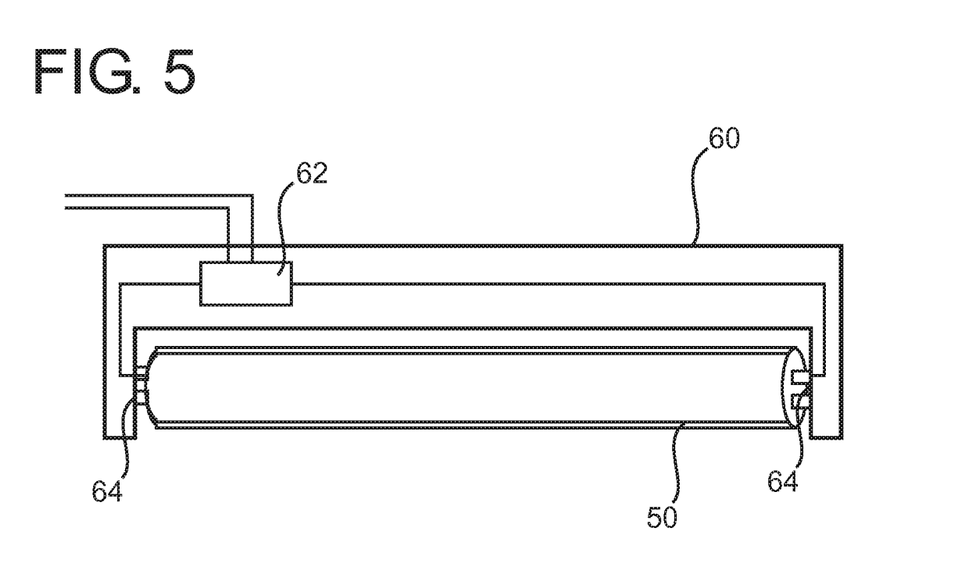
FIG. 5 shows a symbolic representation of a lighting unit according to FIG. 4 within a lighting fixture.

FIG. 5 shows the use of the lighting unit 50 mounted within a lighting fixture 60 as replacement for a standard fluorescent lamp. The lighting fixture 60 comprises a ballast 62 connected to mains power. The ballast 62 supplies AC electrical power to sockets 64 of the lighting fixture. The lighting unit 50 is mounted with its plug contacts 54 within the sockets 64. Thus, during operation of the lighting fixture 60, the ballast 62 supplies AC electrical power to the sockets 64, such that the AC electrical power is supplied within the lighting unit 50 to the electrical supply circuit 12. As described above, the electrical supply circuit 12 converts the AC electrical power to a rectified DC electrical power and supplies this to the electrical supply terminal 32 of the strip 40. Within the strip 40, the LEDs are operated, each being driven by an individual driver circuit 36 of the individual lighting segment 30a, 30b, 30c etc.

In the following, embodiments of circuits according to the general principle shown in FIG. 1 and discussed above will be described in detail. As the skilled person will appreciate, the following examples are illustrative only, and a number of further circuits may also be suited to realize the general principle according to FIG. 1. It should be emphasized that for the following examples, elements thereof, such as e.g. the use of bipolar transistors versus field effect transistors, or the use of a microcontroller or other program execution or state machine logic, different coupling networks and local signal circuits versus central control signal circuits may be interchangeable between the embodiments.

Figure 6:
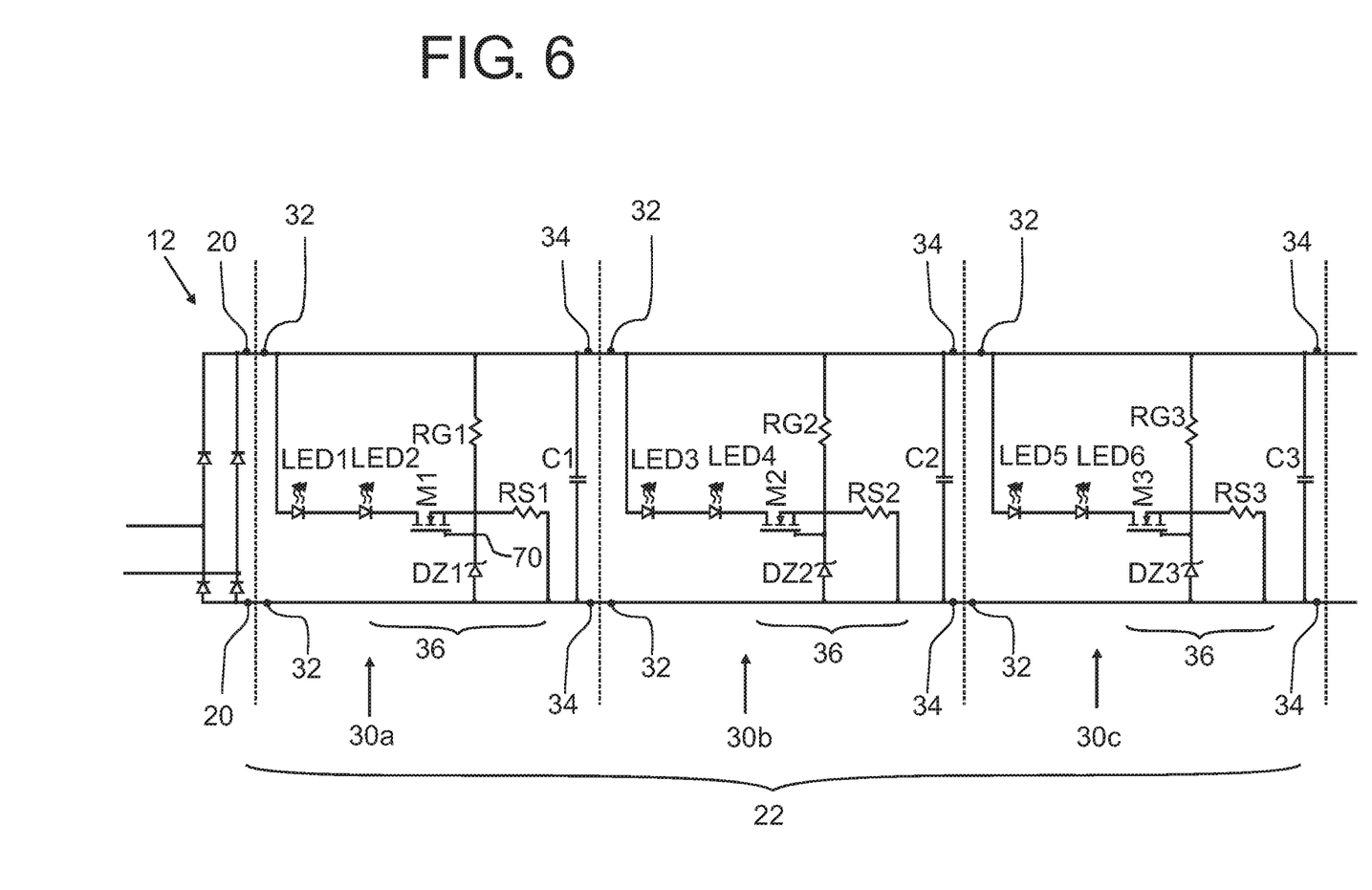
FIG. 6 shows a first embodiment of a circuit for a lighting unit.

FIG. 6 shows a first embodiment of a circuit without a central control unit. An electrical supply unit 12 consists only of a full bridge rectifier circuit delivering a rectified, but not filtered or smoothened, DC voltage to the electrical supply terminal 20 of the circuit 22 consisting of identical lighting segments (of which only three are shown as an example) 30a, 30b, 30c connected in series with one another, such that starting from the second lighting segment 30b, each lighting segment is connected with its segment input terminal 32 to a segment output terminal 34 of the preceding lighting segment. Thus, the circuit according to the first embodiment shown in FIG. 6 has the same structure as the general concept of the circuit shown in FIG. 1.

Within each lighting segment 30a, 30b, 30c, a filter capacitor C1, C2, C3 is connected between the segment input terminals 32, or—since those are directly interconnected—the segment output terminals 34. Thus, the total filter capacity, which is equal to the sum of the capacities of the individual capacitors C1, C2, C3, is distributed over the length of the strip 40 on which the segments 30a, 30b, 30c are arranged (FIG. 2, 3).

Like in the general structure, each lighting segment 30a, 30b, 30c comprises LED elements and a driver circuit 36. In the shown example, each lighting segment comprises two individual LED elements connected in series (LED1, LED2 for the first lighting segment 30a, LED3, LED4 for the second lighting segment 30b, LED5, LED6 for the third lighting segment 30c). As will be understood by the skilled person, the shown example of only three lighting segments 30a, 30b, 30c is for illustrative purposes only. In practice, the number of lighting segments to be used in the lighting unit may vary. Also the number of LED elements may vary.

The driver circuit 36 of each lighting segment comprises a series resistor RS1, RS2, RS3 used as current sensing element, a Zener diode DZ1, DZ2, DZ3 in a voltage divider configuration with a voltage divider resistor RG1, RG2, RG3 to serve as a reference voltage element, and a field effect transistor M1, M2, M3 to serve as a controllable current limiting element for controlling the current through the LED elements. The voltage divider circuit comprised of the Zener diode DZ1, DZ2, DZ3 and the voltage divider resistor RG1, RG2, RG3 is connected between the input/output terminals 32, 34 to deliver at its central connection point 70 a potential constant relative to the anode of the Zener diode DZ1, DZ2, DZ3. This voltage is supplied as a control signal to the gate of the field effect transistor M1, M2, M3, which in the present example is of the n-channel enhancement type. The LED elements LED1, LED2; LED3, LED4; LED5, LED6 are connected in series to the drain of the field effect transistor M1, M2, M3, whose source is further connected to the series (current sensing) resistor RS1, RS2, RS3. The whole series connection of LEDs, field effect transistor and series resistor is connected between input/output terminals 32, 34 as shown.

In operation, the potential of central connection point 70 will be supplied as a control signal to the gate of the field effect transistor M1, M2, M3, leading to a certain degree of conductivity between source and drain, which is dependent also on the source potential of the field effect transistor M1, M2, M3. Consequently, a current will flow through the LED elements LED1, LED2; LED3, LED4; LED5, LED6 and the series resistor RS1, RS2, RS3. Depending on the magnitude of this current, the source potential of the field effect transistor M1, M2, M3 will vary, so that the driver circuit 36 acts as a constant current source: If the driving current exceeds a desired nominal current value, the source potential of the transistor M1 will rise, so that the gate/source voltage drop relative to the fixed potential connection point 70 will lead to reduced conductivity of the drain/source path of the transistor M1, M2, M3, thus limiting the current. Otherwise, if the current decreases to a value below the desired nominal current, the resulting lower source potential in comparison to the fixed potential of the central connection point 70 will lead to increased conduction of the transistor M1, M2, M3.

Consequently, the driver circuit 36 will adjust the driving current through the LED elements LED1, LED2; LED3, LED4; LED5, LED6 to a more or less constant value close to a desired nominal current value, with very little influence from variations of the supply voltage at input/output terminals 32, 34.

In a preferred example, the circuit shown in FIG. 6 is driven by an alternating voltage of 100 V AC, supplied via an inductive current limiter, e.g. from a magnetically ballasted TL (fluorescent tube lamp) fixture. In this fixture (FIG. 5), instead of a TL lamp, now an LED lighting unit 50 including a strip 40 with the circuit shown in FIG. 6 is fitted, such that the 100 V AC voltage is supplied to the electrical supply unit 12 (bridge rectifier). While it would also be possible to distribute the rectifier component along the length of the strip, i.e. integrate a rectifier component into each lighting segment, or at least into a number of lighting segments, in the case of a lighting unit replacing a TL lamp the current will typically be below 1 A, which may easily be handled even by a very small bridge rectifier, so there would not be much benefit from distributing this component.

The total forward voltage of the LED elements connected in series per lighting segment should be matched to the supply voltage in such a way that there is still headroom for the controllable current limiting element to regulate the current. For an exemplary application, a total LED forward voltage in the range of 90-110V may be used. This can be done by series-connecting an appropriate amount of LEDs (of approximately 3V each). There are also higher-voltage LED packages, where e.g. 2 LED packages of approximately 50V each could be used.

Figure 7:
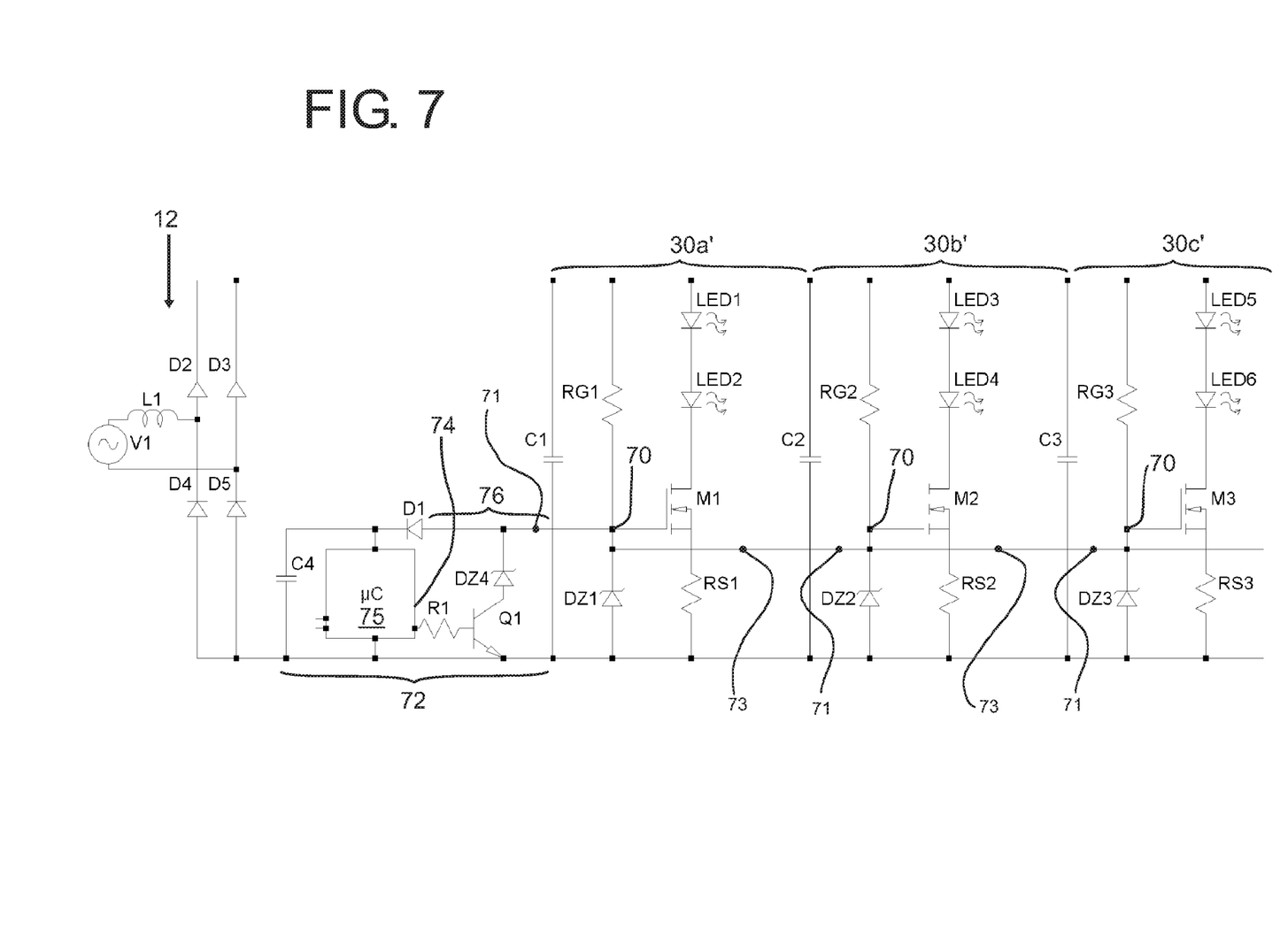
FIGS. 7-11 show circuit diagrams for a second, third, fourth, fifth, and sixth embodiment of a lighting unit.

FIG. 7 shows a second embodiment of a circuit, which also is an embodiment of the general principle shown in FIG. 1. As the skilled person will appreciate, the circuit shown in FIG. 7 is quite similar to the circuit shown in FIG. 6. Like parts are referenced by like reference numbers. In the following, only the differences between these two circuits will be explained in detail.

As already explained with regard to FIG. 6, the Zener diodes DZ1, DZ2, DZ3 in each lighting segment 30a, 30b, 30c serve to establish a reference potential at a central connection point 70, which is used as a control signal supplied to the transistor M1, M2, M3 acting as controllable current-limiting element for the current through the LED elements. In the second embodiment according to FIG. 7, the potential of the central connection point 70 is not only determined by Zener diodes as reference voltage elements within local control signal circuits 36, but also by a central control signal delivered from a central control signal circuit 76 which is part of a central control unit 72. The central control signal is delivered into each lighting segment 30a', 30b', 30c' at a control signal input terminal 71 and from there it is directly passed on via a control signal output terminal 73 to the next lighting segment.

The control unit 72 comprises a microcontroller 75 with a control output 74. A central control signal circuit 76 connects the microcontroller output 74 to the control signal input terminal 71 of the first lighting segment 30a' and thus to the central connection point 70 of each lighting segment 30a', 30b', 30c'.

The microcontroller 75 can supply a voltage signal at its output 74, which drives a central control signal circuit 76 including a transistor Q1 which is coupled with its base to the output 74 via a resistor R1. The transistor Q1 is connected to the central connection point 70, and thus to the gate of transistors M1, M2, M3, via a Zener diode DZ4.

The microcontroller 75 may be of a low-power type, such that it is possible to use, as shown, the existing circuitry also as power supply for the microcontroller.

By applying a suitable signal at the output 74, the microcontroller 75 can influence the potential of the central connection point 70, and thus the control signal supplied to the transistors M1, M2, M3 in the individual lighting segments 30a', 30b', 30c'. Thus, the microcontroller 75 can permanently influence or modulate in a time-variant manner the current flowing through the transistors M1, M2, M3 and consequently through the LEDs, so that the LED light output will have a modulated intensity. Thus, the light output may be dimmed either by supplying a permanently low control signal, or by continuously modulating the current through the LED elements in a time-variant manner.

In the example of FIG. 7, the microcontroller 75 may temporarily lower the potential of central connection point 70 to the Zener voltage of DZ4. Thus, as long as the signal is generated at output 74 to render transistor Q1 conductive, the light output will drop.

Figure 8:
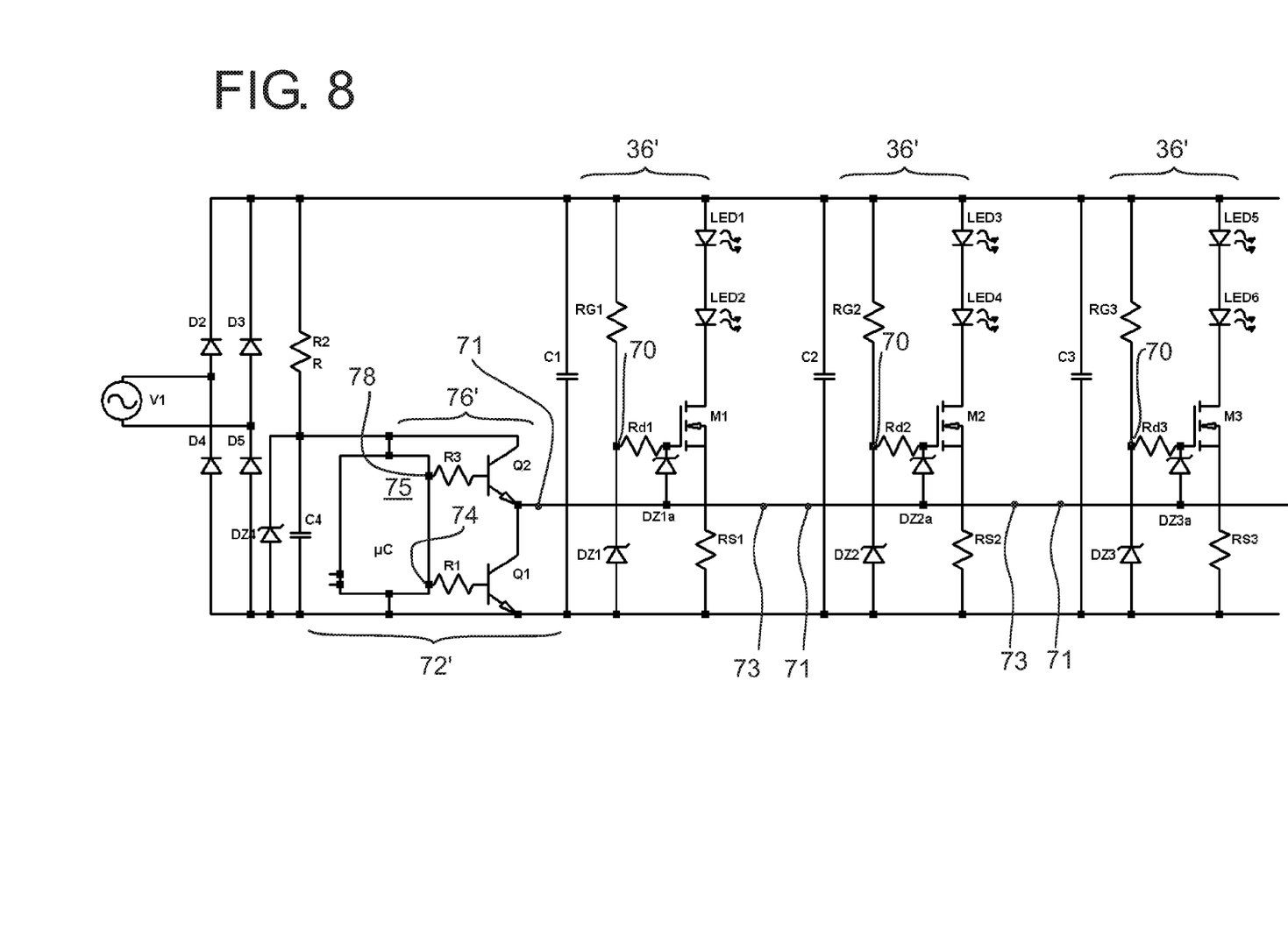
Figure 9:
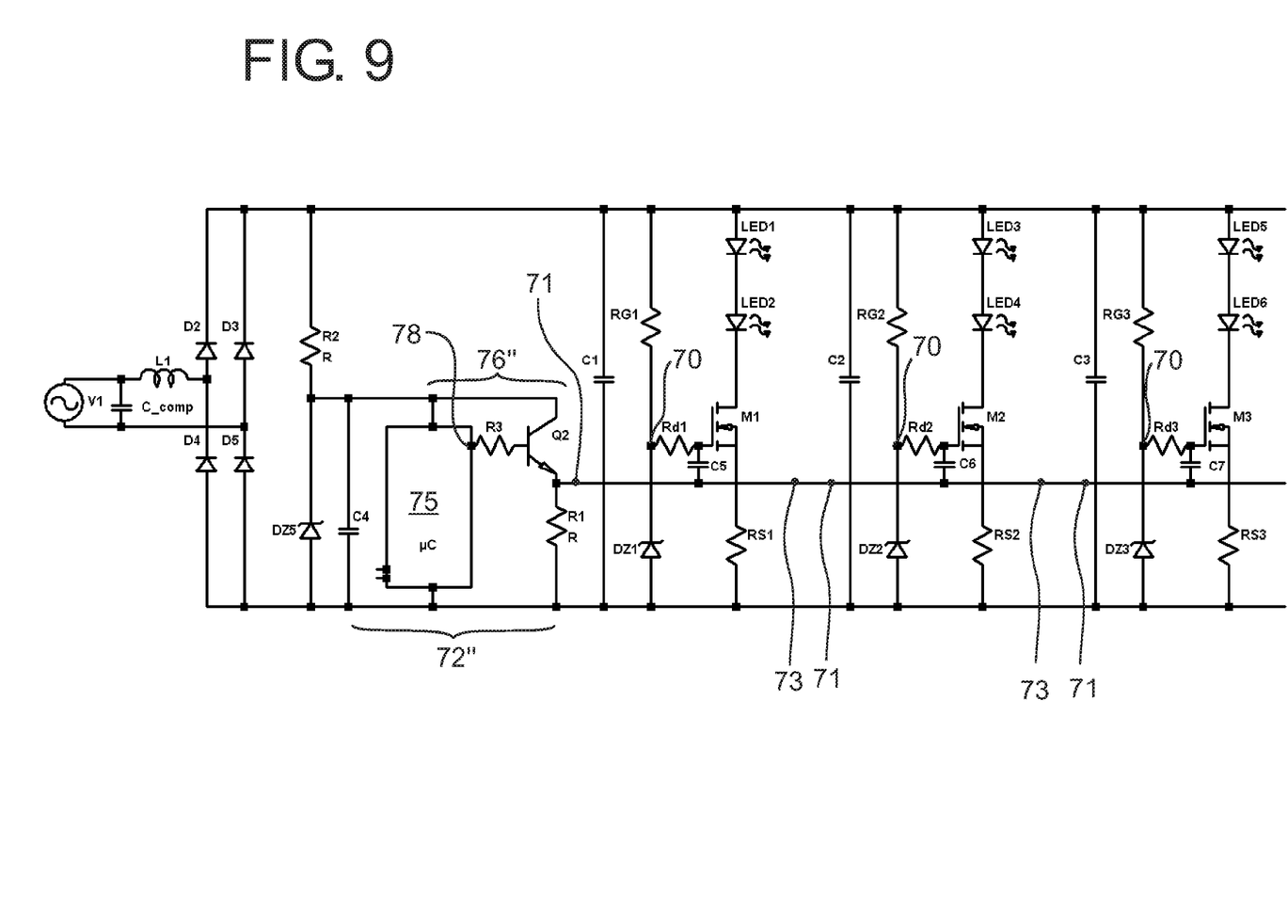

FIGS. 8, 9 show a third and a fourth embodiment of circuits, which, as the skilled person will appreciate, have many elements in common with the second embodiment. Like parts are referenced by like reference numerals. In the following, only differences will be described in detail.

To give examples of possible power supply circuits, FIG. 8 shows a directly connected AC source and FIG. 9 shows an AC source connected via a series inductance L1 and a parallel capacitor C_comp.

In the embodiment of FIG. 8, a central control unit 72' again comprises a microcontroller 75, only this time with a first output 74 and a second output 78. The outputs 74, 78 are connected via resistors R1, R2 to transistors Q1, Q2, between which the control signal input terminal 71 is connected, which in turn is connected, in each segment, to the central connection point 70 via a Zener diode DZ1a, DZ2a, DZ3a and resistors Rd1, Rd2, Rd3. Thus, the circuit shown in FIG. 8 comprises a central control signal circuit 76' and in each segment a local control signal circuit 36', and in addition to the control signal (potential at central connection point 70) generated in the local control signal circuit discussed with reference to FIG. 6, a central control signal is coupled in via the Zener diodes DZ1a, DZ2a, DZ3a and resistors Rd1, Rd2, Rd3.

In operation, the circuit of FIG. 8 may be used to modulate the current through the LEDs and thus the light output. Depending on the signals generated at outputs 74, 78 of the microcontroller 75, the potential at the central connection point 70 may be either raised (signal at second output 78) or lowered (signal at first output 74), thus modulating the output light intensity. The Zener diodes serve for decoupling the individual central connection points 70 of the lighting segments 36' from each other. Hence, in case both transistors Q1 and Q2 are not active, all central connection points 70 of lighting segments 36' should be decoupled from each other.

In the alternative example shown in FIG. 9, the central control unit 72" comprises microcontroller 75 and central control signal circuit 76". Here, output 78 may be used to apply a signal for generating a central control signal to be distributed to each lighting segment via control signal input and output terminals 71, 73 coupled to the central connection point 70 in each lighting segment via a capacitor C5, C6, C7 and resistors Rd1, Rd2, Rd3. Thus, by applying a signal at the output 78, microcontroller 75 may raise the potential at the central connection point 70 of each segment to increase the current and consequently the light output to achieve a desired modulation.

Figure 10:
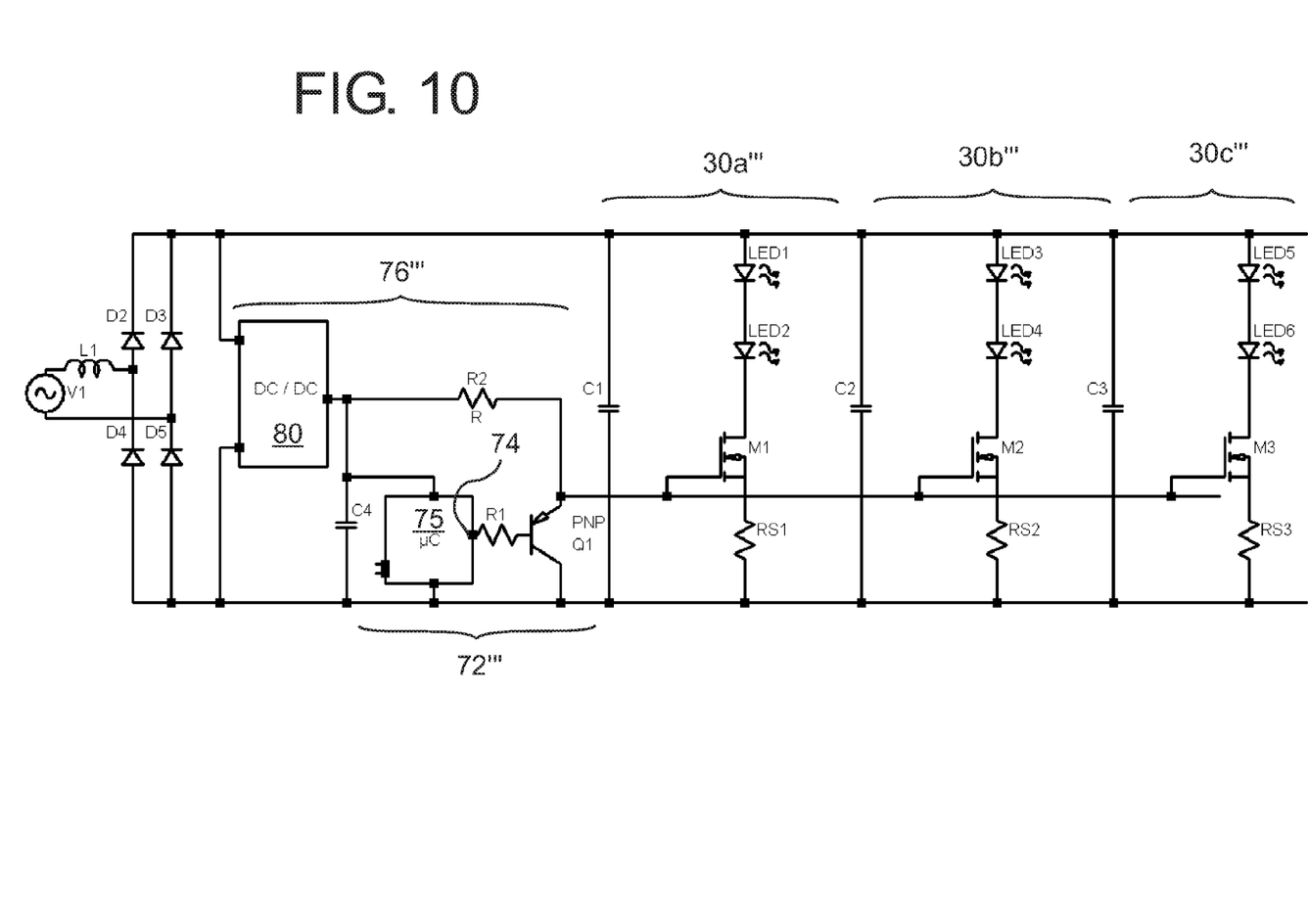

FIG. 10 shows a still further example of a circuit realizing the general concept shown in FIG. 1. Again, each lighting segment 30a''', 30b''', 30c''' comprises, as already described with reference to FIG. 6, two LED elements connected in line with a field effect transistor and a series resistance. A buffer capacitor C1, C2, C3 is arranged in parallel. However, in the embodiment shown in FIG. 10, the control signal applied to the gate of the field effect transistor M1, M2, M3 is not generated locally by a local control signal circuit in each lighting segment, but is delivered from a central control unit 72''' including a microcontroller 75 and a central control signal circuit 76'''. Here, the control signal is set by the microcontroller 75 via the drive signal 74 (which in this case would preferably be an analogue output signal, generated from any kind of digital to analogue converter, either embedded in the microcontroller 75 or realized by extra circuitry, e.g. a digital PWM output and a filter stage), using the transistor Q1 and the surrounding resistors. The supply power is delivered, in this example, by a DC/DC converter 80. Microcontroller 75 may further modulate the current value by applying a signal at output 74, thus rendering transistor Q1 more or less conductive and lowering or increasing the potential applied at the gate of the field effect transistor M1, M2, M3 in each segment.

Figure 11:
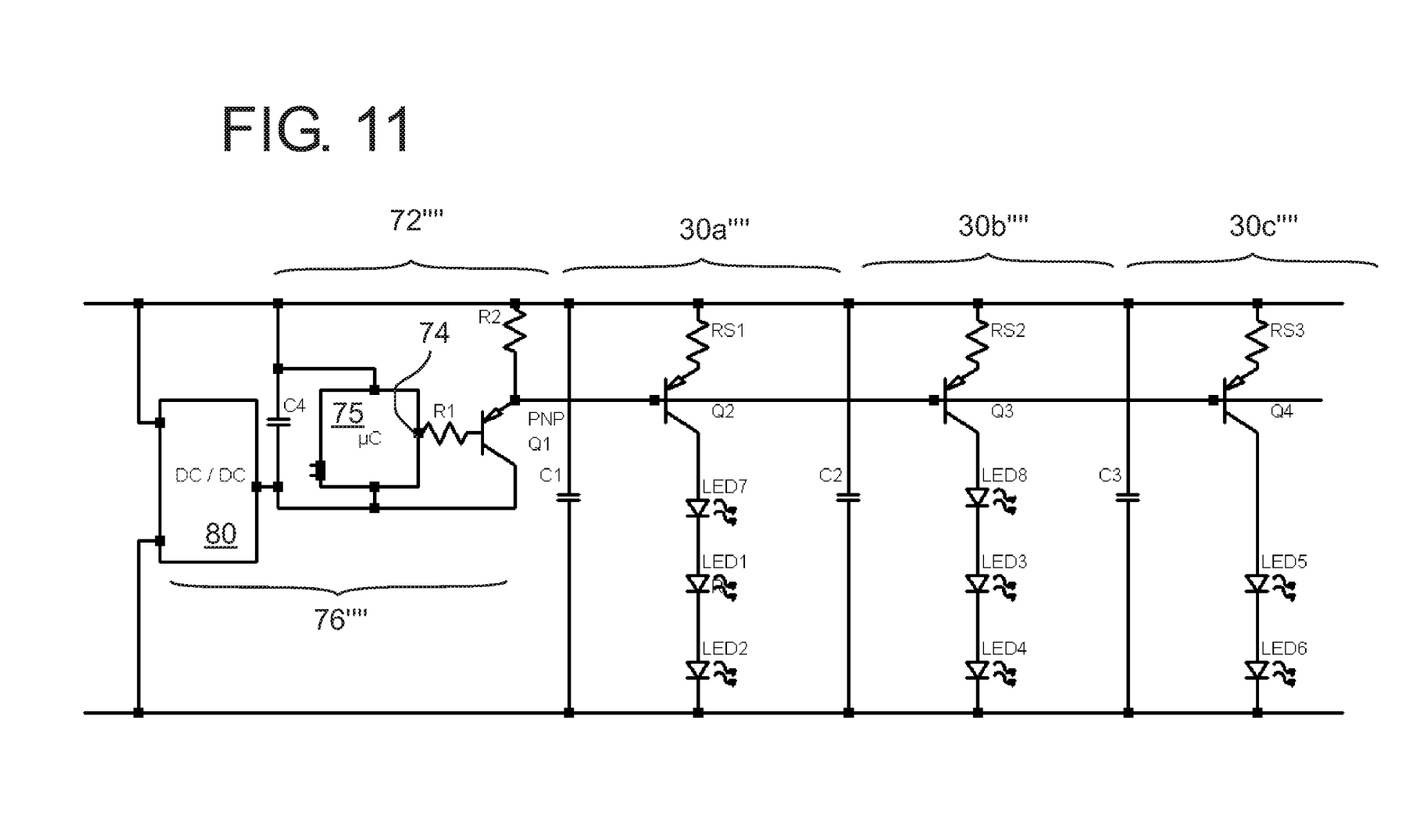

FIG. 11 shows a yet further embodiment, where a signal control circuit 72'''' similar to the control circuit 72''' shown in FIG. 10 also delivers a central control signal from a central control signal circuit 76'' to each lighting segment 30a'''', 30b'''', 30c''''. The control signal delivered for nominal operation by a DC/DC converter 80 may be modulated by microcontroller 75 by applying a signal at its output 74.

Within each lighting segment 30a'''', 30b'''', 30c'''', there is a filter capacitor C1, C2, C3 connected in parallel to the series connection of a series resistor RS1, RS2, RS3, an emitter and collector of a bipolar PNP transistor Q2, Q3, Q4 and a number of LED elements arranged in series. The control signal generated by central control signal circuit 76'' is applied to the base of the bipolar transistors Q2, Q3, Q4 acting as controllable current limiting elements in each lighting segment 30a'''', 30b'''', 30c''''.

It should be noted that in the example shown in FIG. 11, the third lighting segment 30c'''' comprises only two LED elements LED 5, 6, whereas the other lighting segments 30a'''', 30b'''' comprise three LED elements each. While it is generally preferred to provide identical circuits in each lighting segment, the present example serves to demonstrate that it is also possible to use different circuit configurations. In the case of the example of FIG. 11, series resistance RS3 in the third segment 30c'''' may be chosen to have a low value as compared to series resistances RS1, RS2 in the remaining lighting segments. Thus, it is possible to achieve substantially the same light output (flux) from the LEDs in each lighting segment 30a'''', 30b'''', 30c''''. Alternatively, when using LED elements with different efficiency, i.e. substantially the same forward voltage but a different (higher) lumen per ampere ratio, other choices for the resistor value of RS3 may apply. FIG. 11 also covers the different forward voltages per LED package, as discussed before. It may be that the forward voltage per LED element LED 5 and LED 6 is higher than for the other LED elements.

The invention has been illustrated and described in detail in the drawings and foregoing description. Such illustration and description are to be considered illustrative or exemplary and not restrictive; the invention is not limited to the disclosed embodiments. In the examples shown above, the modulation or coupling between the segments was always realized via the control input of the active current limiting element, i.e. by altering the base or gate voltage potential. It should be noted that similar modulation is also possible when applying a signal to the current sensing resistor RS1, RS2, RS3. In such an embodiment, the connection point between the current sensing resistor and the active current limiting element of the segments is connected with the neighbouring segments and the central control signal generator (directly or via decoupling means) and exposed to the signal from a central control signal generator.

In the claims, the word "comprising" does not exclude other elements, and the indefinite article "a" or "an" does not exclude a plurality, The mere fact that certain measures are recited in mutually different dependent claims or are described in mutually different preferred embodiments does not indicate that a combination of these measures cannot be used to advantage. Any reference signs in the claims should not be construed as limiting the scope.

The invention claimed is:

1. A lighting unit comprising:
a plurality of lighting segments arranged on a flexible strip, each lighting segment in spaced relation from each other, and each lighting segment being electrically connected to an electrical supply terminal, each lighting segment comprising:
an LED element;
a driver circuit including a controllable, current limiting element for controlling a current through said LED element;
a segment input terminal; and
a segment output terminal;
wherein the segment input terminal of a first of said plurality of lighting segments is electrically connected to said electrical supply terminal; and
wherein said plurality of lighting segments are arranged such that a segment input terminal of each respective lighting segment is connected to a segment output terminal of said respective lighting segment's neighboring lighting segment;
wherein each respective lighting segment is configured to be severable from said respective lighting segment's neighboring lighting segment by disconnecting the respective lighting segment's input or output terminal from the neighboring lighting segment's input or output lighting terminal, and wherein a group of one or more of said lighting segments separated from one or more of said remaining lighting segments are still operable by means of electrical power supplied to at least one of said segment input terminals; and
wherein said flexible strip is configured to be severable between any of the plurality of lighting segments.

2. The lighting unit according to claim 1, wherein said controllable current limiting element is controlled by a control signal from a control signal circuit to control said current through said LED element.

3. The lighting unit according to claim 2, wherein said control signal circuit comprises a reference voltage element to deliver a constant voltage signal.

4. The lighting unit according to claim 3, further comprising a central control unit delivering a central control signal to said driver circuits.

5. The lighting unit according to claim 4, wherein each of said lighting segments comprises a capacitor arranged to buffer a supply voltage.

6. The lighting unit according to claim 5, wherein said driver circuit comprises a current sensing element arranged in series with said LED element.

7. The lighting unit according to claim 6, wherein said lighting segments are electrically connected in parallel to said electrical supply terminal.

8. The lighting unit according to claim 7, wherein each lighting segment comprises a plurality of LED elements electrically connected in series.

9. The lighting unit according to claim 8, further comprising an electrical supply unit including an AC/DC converter to supply DC voltage to said electrical supply terminal.

10. The lighting unit according to claim 9, further comprising an elongate housing element comprising electrical contacts arranged at least at one end thereof, said strip being arranged at said elongate housing element, and said electrical contacts being connected to said electrical supply terminal.

11. The lighting unit according to claim 10, wherein said housing element is a transparent or translucent enclosure, and said strip is arranged within said enclosure.

12. The lighting unit according to claim 4, each lighting segment further comprising a Zener diode and a resistor for coupling in the central control signal.

13. The lighting unit according to claim 4, wherein the central control unit comprises a microcontroller with a control output.

14. A lighting fixture including:
a ballast for supplying AC electrical power to a socket,
wherein a lighting unit according to claim 1 is arranged within said socket, such that said electrical supply terminal is electrically connected to said ballast.

15. A lighting unit comprising:
a plurality of lighting segments arranged on a flexible strip, each lighting segment in spaced relation from each other, and each lighting segment being electrically connected to an electrical supply terminal, each lighting segment comprising:
an LED element;
a driver circuit including a controllable, current limiting element for controlling a current through said LED element;
a segment input terminal; and
a segment output terminal;
a central control unit delivering a central control signal to said driver circuit, wherein said controllable current limiting element is controlled by the control signal from the control signal unit to control said current through said LED element;
wherein the segment input terminal of a first of said plurality of lighting segments is electrically connected to said electrical supply terminal;
wherein said plurality of lighting segments are arranged such that a segment input terminal of each respective lighting segment is connected to a segment output terminal of said respective lighting segment's neighboring lighting segment;
wherein each respective lighting segment is configured to be severable from said respective lighting segment's neighboring lighting segment by disconnecting the respective lighting segment's input or output terminal from the neighboring lighting segment input or output lighting terminal, and wherein a group of one or more of said lighting segments separated from one or more of said remaining lighting segments are still operable by means of electrical power supplied to at least one of said segment input terminals; and
wherein said flexible strip is configured to be severable between any of the plurality of lighting segments.

* * * * *